United States Patent [19]
Wilson

[11] 4,078,309
[45] Mar. 14, 1978

[54] MITER SAW

[76] Inventor: Ernest V. Wilson, 1501 NE. 6th St., Grants Pass, Oreg. 97526

[21] Appl. No.: 761,640

[22] Filed: Jan. 24, 1977

[51] Int. Cl.² .................................................. B27B 5/20
[52] U.S. Cl. .................................................. 30/375
[58] Field of Search ................................ 30/371–377, 30/286; 83/471.2, 467 R, 467 A, 745

[56] References Cited

U.S. PATENT DOCUMENTS

| 2,819,742 | 1/1958 | Blachly | 30/373 |
| 3,262,472 | 7/1966 | McCarty et al. | 30/376 |
| 3,645,307 | 2/1972 | Stocker | 30/376 |

*Primary Examiner*—Robert C. Watson
*Attorney, Agent, or Firm*—Kolisch, Hartwell, Dickinson & Stuart

[57] ABSTRACT

This invention provides a portable rotary saw having auxiliary means settable to select, define and control various cutting planes for the saw in relation to a top and/or side surface of the piece to be cut. Given, for example, a long heavy work piece of uniform length, width and depth, mounted fixedly in a flat condition on two or more sawhorses, auxiliary saw control means can be set to cause the saw blade to cut in a plane at right angles to the upper face of the work piece and either directly lengthwise, directly crosswise, or at any desired oblique angle across the work piece. Additionally or alternatively, the saw may be set to cut through the work piece on an unrestricted variety of bevels in any of the directions referred to. A track which is carried by the saw may be set on the work piece to guide the saw in a path parallel to a side face of the work piece or in any desired direction relative to such face. The track provides for smooth and substantially friction-free traverse of the saw and appurtenant parts relative to the track and the work piece.

12 Claims, 12 Drawing Figures

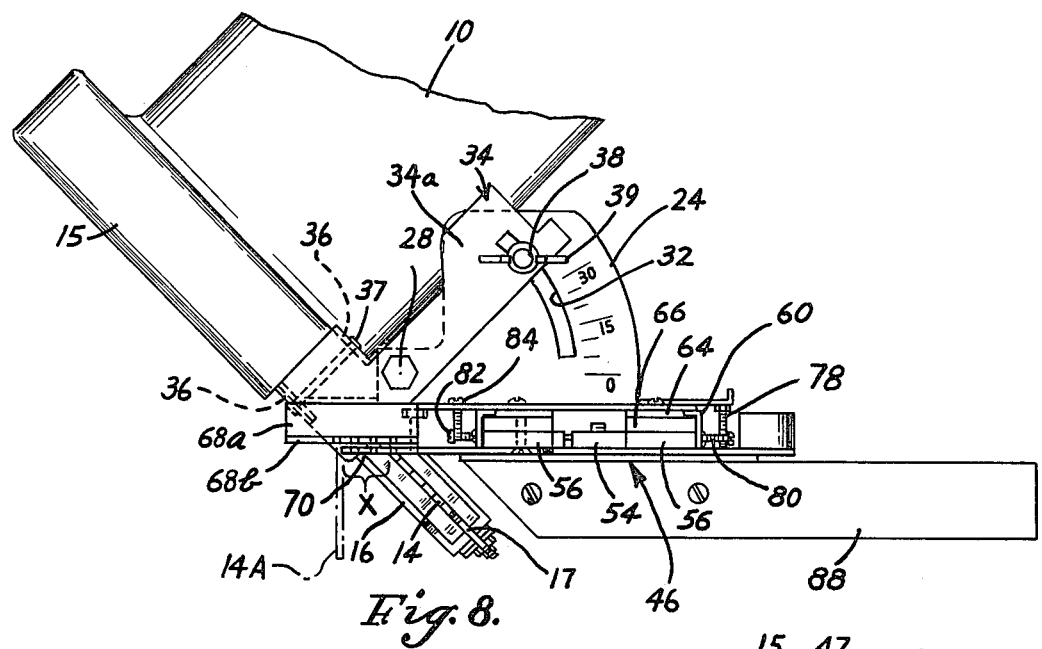
Fig. 8.
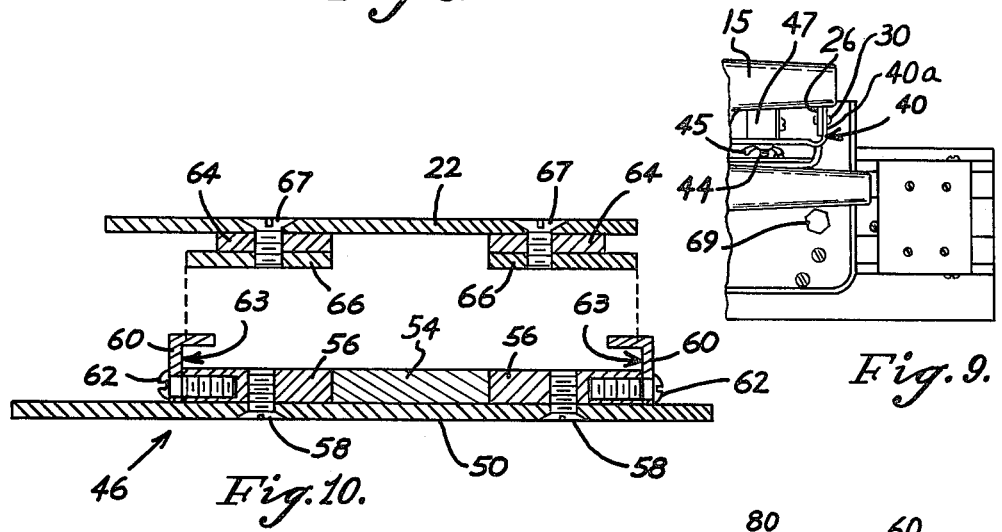
Fig. 9.
Fig. 10.
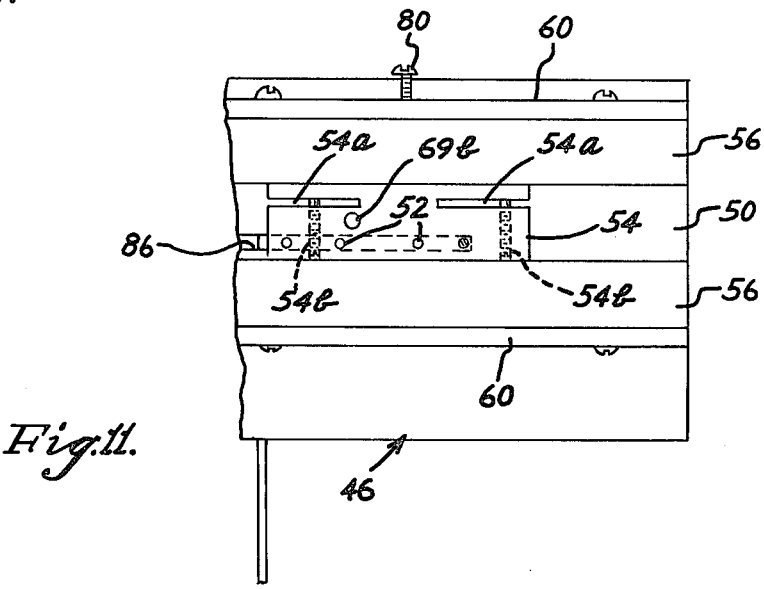
Fig. 11.

MITER SAW

BACKGROUND AND SUMMARY OF THE INVENTION

This invention relates to the sawing of lumber by a hand-carried, power-driven saw, and particularly to the sawing of long, heavy pieces of lumber which it would be awkward to feed to a conventional stationary table saw. It is a primary feature that the comparatively light saw is carried to the work and is controlled in its movements by suitable settings relative to the work. The work piece itself will generally be supported substantially horizontally or at least in a substantially straight, flat condition on two or more sawhorses. So long as convenience is served, the sawhorses, rather than the work piece, can be readjusted.

A board or beam on which sawing is required to be done will generally be of right, prismatic form. That is to say, it will be of uniform thickness and uniform width, the top and bottom surfaces being parallel to one another. For illustrative purposes, this may be assumed to be the fact.

Assuming that such a work piece is supported, roughly at least, in a horizontal, straight condition on two or more sawhorses, it may be desired to make any one or more of a wide variety of cuts including any one of the following: (a) a lengthwise cut in a vertical plane at right angles to the top and bottom surfaces of the work piece; (b) a cross-cut in a vertical plane at right angles to the top and bottom surfaces and to the side faces of the work piece; or (c) a diagonal cut at right angles to the top and bottom surfaces of the work piece but at any oblique angle crosswise of the work piece. In all of these instances the saw blade should travel in a vertical plane.

In any one of the above-mentioned directions, beveled instead of square cut surfaces may be desired, in which case the saw blade should desirably be mounted with provision for setting it at a tilted angle to the flat top of the work piece of any indicated value up to at least 45°. To these ends the saw is mounted upon a guiding platform that is adapted to rest upon the top surface of the work piece. The saw is mounted for tilting relative to the platform about an axis extending substantially parallel to the top surface of the work piece, with freedom for controlled movement of the blade in a plane determined by adjusted settings of the kind indicated above.

It is a feature of my novel structure that the ultimate work engaging structure, other than the saw blade itself, is caused during any sawing operation to occupy a fixed position relative to the work piece and to provide a smooth friction-free track for smoothly and accurately controlling the advance of the saw blade in one or more steps in the direction for which it is set.

It is a significant feature that a saw guard, which tilts in unison with the saw and is spring biased forward toward a blade covering position, carries a follower in the plane of the saw that fits into the saw cut rearwardly of the saw blade for stabilizing the saw in the intended cutting plane, thereby obviating binding strains upon the saw and possible objectionable deviations from the intended cutting plane.

The saw guard is yieldably biased to turn toward the work piece and in the direction the saw is moved to make a cut, so that the follower always travels in the slot formed by the saw regardless of whether the saw is being advanced in a slanted or upright attitude.

It is a further feature that provision is made for tilting the blade to make bevel cuts up to forty-five degrees, about a tilt axis so located that a desired depth of blade penetration will be achieved regardless of the tilt of the blade. Penetration of the saw for the full thickness of the work piece will be assured.

Adjustment of the tilt angle of the saw blade relative to the work piece shifts the point at which the blade intersects the work piece a distance laterally of a line guide on the sawhorse and may cause the user to cut along a line spaced laterally from the desired cut line. Indexing notches are provided to indicate the true cut line for various tilt angles.

DRAWINGS

Other objects and advantages will hereinafter appear as the specification is read in conjunction with the drawings, wherein:

FIG. 8 is a fragmentary front elevation view showing the saw set for making a forty-five degree bevel cut;

FIG. 9 is a fragmentary top plan view of the rear end of the device;

FIG. 10 is an enlarged transverse sectional view taken along the line 10—10 in FIG. 1. through the guide structure and the cooperative, carriage-carried structure, which are interfitted in the machine, but are shown in the figure spaced vertically from one another;

FIG. 11 is a fragmentary, plan view of a portion of the guide structure of FIG. 10.

DETAILED DESCRIPTION OF PREFERRED EMBODIMENT

Figure 1:
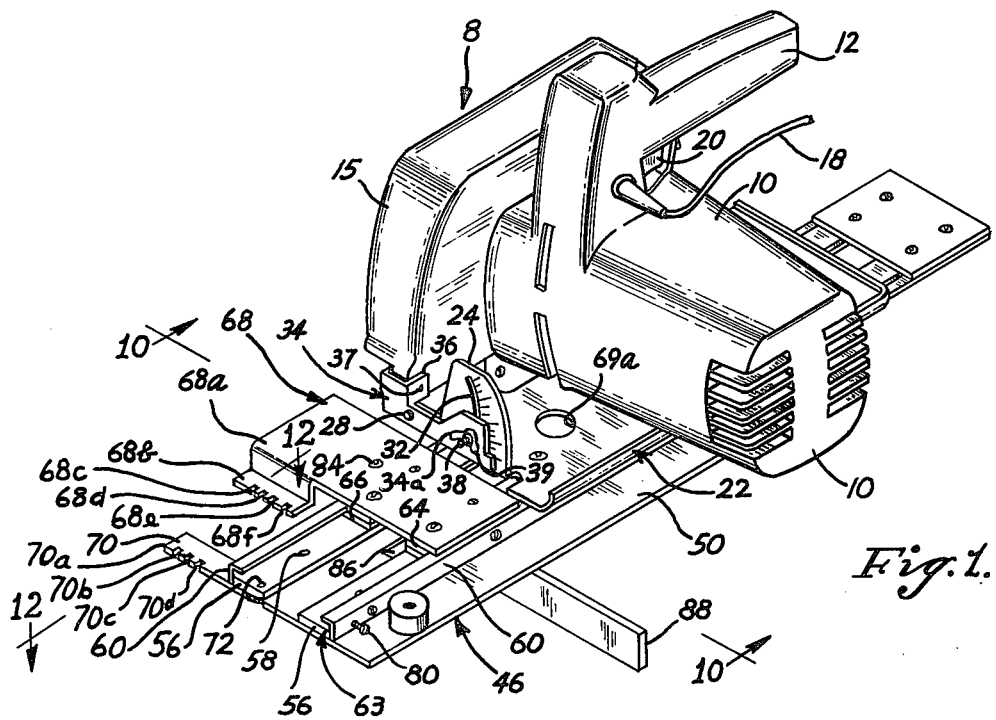
FIG. 1 is a perspective view of a novel saw device constructed according to an embodiment of the invention.

Referring to the drawings, and first more specifically to FIG. 1, at 8 is indicated generally sawing apparatus constructed according to an embodiment of the invention. The apparatus generally is a portable saw unit which comprises a motor housing 10, a handle 12, a rotary saw blade 14, a blade housing 15 and a retractable and forwardly biased blade guard 16. Blade 14 is operatively connected to a motor mounted within housing 12 which, on operation of the apparatus, is operable to rotate blade 14 under power in a plane about its central axis.

Referring to FIGS. 4–6 and 8, it will be seen that the blade guard 16 carries a saw follower 17 in alignment with blade 14. Follower 17 is constructed of a piece of plate material which is of a thickness slightly less than the width of a cut which may be made by blade 14. The follower is positioned in alignment with the blade whereby it may ride in the cut made by the saw blade to aid in maintaining the advance of the saw in an undeviating straight line as will be explained more fully below.

The housing, handle and blade housing are secured in a fixed unitary relationship to each other. The motor in housing 12 is supplied electricity through a cable 18 and operation of the motor is controlled by a switch handle or trigger 20.

A substantially planar base plate or carriage 22 underlies housing 12.

A plate member 24 is secured to and extends upwardly substantially normally from the upper surface of base plate 22. An arcuate guide slot 32 is formed in member 24 and has degree markings scribed thereon ranging from 0° to 45°. (See FIG. 8.)

A pivot arm 34 has a pair of laterally spaced ears 36, such as that seen in FIG. 1, which engage opposite sides of the forward end of blade housing 15. A pivot pin 37 pivotally connects pivot arm 34 to blade housing 15 to permit relative swinging of pivot arm 34 and blade housing 15 about the longitudinal axis of pin 37. A planar portion 34a of pivot arm 34 is positioned substantially parallel to and contiguous plate 24. A pivot pin, or bolt, 28 pivotally interconnects pivot arm 34 to plate member 24 to permit swinging of housing 10, handle 12, blade 14, blade housing 15 and guard 16 relative to base plate 22 about the longitudinal axis of pin 28.

As is best seen in FIG. 8, slot 32 is concentric with pivot pin 28. A headed screw or bolt 38 having a wing nut 39 thereon extends through a bore in portion 34a of pivot arm 34 and slot 32. With wing nut 39 loosened, the saw is tiltable relative to base plate 22 between the substantially upright position illustrated in FIG. 2 and a position tilted at substantially forty-five degrees relative to the base plate as illustrated in FIG. 8. The saw may be locked in any desired inclined position by tightening of nut 39.

Figure 4:
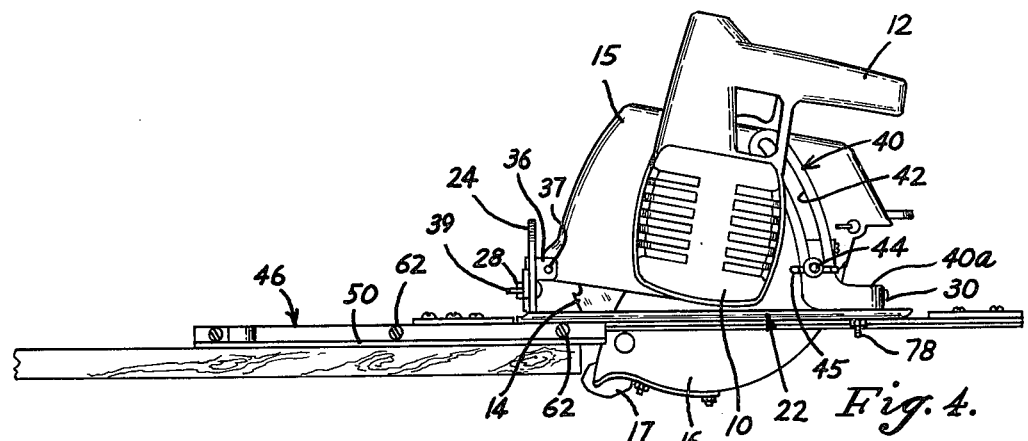
FIG. 4 is a side elevation view of the structure of FIG. 1 as seen directly from the side and with the parts shown ready for rip-cutting a work piece.
Figure 7:
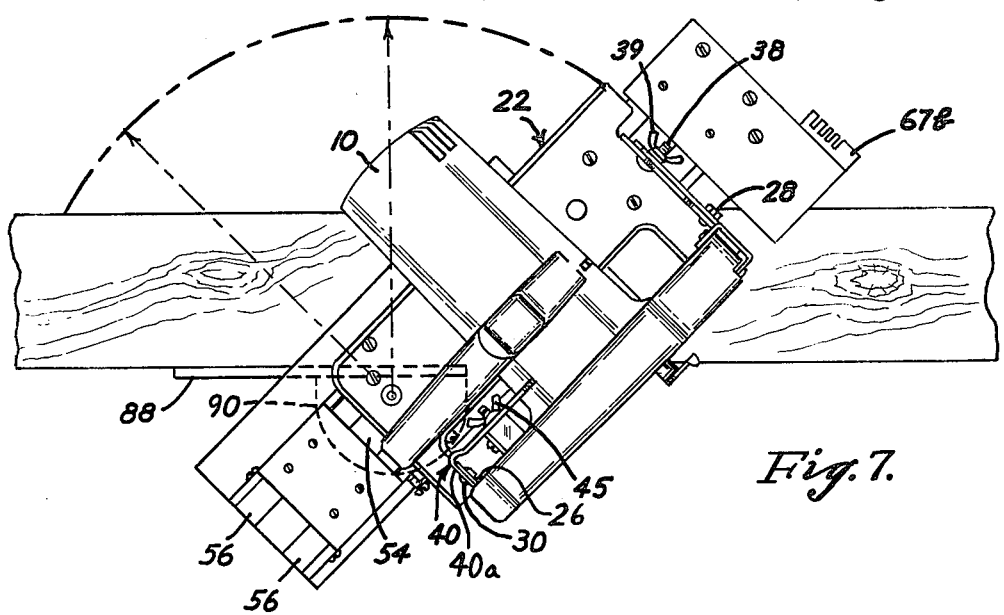
FIG. 7 is a plan view showing the saw set for making a cut at forty-five degrees to the longitudinal axis of the work piece.

Referring to FIGS. 4, 7 and 9, it will be seen that the rear end of blade housing 15 is operatively connected to base plate 22 through a pivot pin 30 which is positioned substantially in alignment with pivot pin 28. This interconnection between the housing and base plate is effected through a lever 40. Lever 40 is disposed generally in a plane parallel to the plane of blade 14. It has an out-turned rear end portion 40a through which is pivotally connected by pivot pin 30 to an upstanding ear 26 secured to base plate 22.

As is best seen in FIG. 4, lever 40 is formed with an arcuate slot 42 which is concentric with pivot pin 37 at the forward end of blade housing 15. A stud bolt 44 secured to and extending outwardly from blade housing 15 extends through slot 42 and has threaded thereon a wing nut 45. A spacer block 47 is interposed between lever 40 and blade housing 15, as is best seen in FIG. 9, to maintain desired alignment between the saw blade and pivot connections provided by pivot pins 28, 30.

Pivot pin 37 and lever 40 provide for tilting of the saw about pivot pin 37 relative to base plate 22 to control the depth of the cut made by saw blade 14.

Explaining the various adjustments made possible by the structure described thus far, if it is desired to change the depth of cut made by the saw blade, it is a simple matter to loosen wing nut 45 to permit the housing and saw blade carried thereby to be swung vertically about pivot pin 37 which extends transversely of the base plate relative to base plate 22 thus to raise or lower the saw blade. Tightening of wing nut 45 serves to lock the blade in a selected position relative to the base plate. Similarly, the loosening of wing nut 39 permits tilting of the saw blade and housing about the pivot axis extending longitudinally of the base plate provided by pivot pins 28, 30 to selectively tilt the saw blade relative to base plate 22. When the blade and housing have been swung to a selected tilt relative to the base plate, it is a simple matter to lock them in this selected position by tightening of wing nut 39. This series of adjustments, thus, is provided to control the depth and angularity of a cut to be made by the saw blade. In the illustrated embodiment, the tilt axis defined by pivot pins 28, 30 is located one inch laterally from the saw blade and a preselected distance above other mechanisms in the apparatus which will be described below.

In the illustrated embodiment the tilt axis defined by pivot pins 28, 30 is located 1⅛ inch above the under surface of track plate 50. The combination of the two distances (one inwardly from the saw blade and one above the bottom of plate 50) is such that when blade 14 is tilted from its upright position as illustrated in FIG. 8 at 14A to the angle position illustrated in solid outline in FIG. 8, the lowermost point of the blade will be spaced at least as far below the underside of plate 50 as when it was in its vertical position. Due to the configuration of the saw, the saw depth penetration would be substantially equal to the natural secant of the angle times the upright, or perpendicular, capacity of the blade.

Assuming that the saw is set to cut to a depth of 1⅝ inches when vertical, with the configuration illustrated when tilted to 15° from the horizontal the saw will penetrate 1.875 inches, at 30° it will penetrate 2 inches, and at 45° it will penetrate 2.3 inches.

Carriage 22 is mounted for sliding movement on a track, indicated generally at 46, which may be placed upon a work piece. The track is normally carried on carriage 22. When the track is placed upon a work piece, the track supports and guides the carriage. The arrangement is such that the carriage and track may be smoothly advanced in alternation, while always mechanically maintaining the saw in the plane to which it has been adjusted relative to the carriage. This feature is particularly of importance in making rip cuts.

The track includes a substantially planar base plate 50 which may be set upon the face of a work piece preparatory to sawing. A pair of elongate, parallel, laterally spaced guide bars 56 (see FIGS. 1, 10, 11) are secured to the upper surface of plate 50 by screws 58 as seen in FIG. 10. To the outer edge surfaces of each of bars 56 are angle bars 60 secured to the guide bars by screws 62. The vertical flanges of angle bars 60 are spaced preselected distances above the upper surfaces of their associated guide bars 56 so that guide channels 63 are provided between the outer margins of guide bars 56 and the downturned flanges of the angle bars.

A relatively short, rectangular block 54 is slidably mounted on the upper surface of plate 50 between guide bars 56, as is best seen in FIGS. 10 and 11. As is best seen in FIG. 11, block 54 is formed with slots 54a in its opposite ends. Screws 54b are adjustable to adjust the effective width of block 54 at its opposite ends to produce a close sliding fit of block 54 within the guide path defined by the inwardly facing edge margins of guide bars 54. A pair of bores 52 are provided in block 54, which bores are spaced apart longitudinally of block 54 and along a line substantially paralleling guide bars 56.

Referring to FIG. 10, secured to the under side of carriage 22 are a pair of elongate laterally spaced, substantially parallel narrow upper bars 64, and elongate, laterally spaced, parallel wider lower bars 66. These bars are secured to carriage 22 by screws 67. The positioning of bars 64, 66 is such that narrow bars 64 fit slidably between the in-turned flanges of angle bars 60, while the outer margins of the lower, wider bars 66 are closely, but comfortably, slidable within guide channel 63. Carriage 22 and the other structure mounted thereon, thus, are mounted for sliding movement along a selected guide path formed by angle members 60 relative to base plate 50.

It will be apparent that when the apparatus thus far described is carried by handle 12, track 46 will be slidingly supported from carriage 22. For carrying purposes, track 46 and associated parts ought not to be free to slide. For carrying purposes, therefore, a headed screw 69 (see FIG. 9) is provided, the shank of which may be passed downwardly through a hole such as that indicated at 69a in FIG. 1 in the carriage and screwed into a threaded bore 69b of block 54 as illustrated in FIG. 11. In normal use, however, screw 69 is withdrawn and plate 50 is set precisely on the work piece and serves as a support for the entire organization.

Secured to the forward ends of bars 64, 66 as seen in FIG. 1 is a cut line indicator plate 68. The plate has a first substantially planar rectangular portion 68a which is secured adjacent one of its end margins to bars 64, 66 and at its other end extends to a position directly forwardly of saw blade 14. A guide portion 68b of plate 68 is spaced a distance below portion 68a, to place it in a position where its lower surface is only slightly above the plane of the under surface of plate 50 of track 46. The leading edge of guide portion 68b has a plurality of notches 68c, 68d, 68e, 68f formed therein which are spaced apart substantially equal distances extending laterally of the saw blade (see FIGS. 1, 3, 12).

Figure 3:
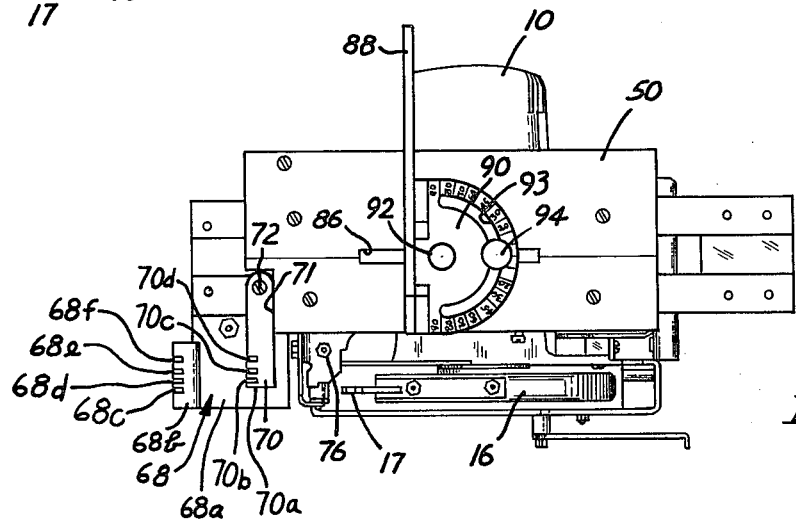
FIG. 3 is a bottom plan view of the structure of FIGS. 1 and 2 on the scale of FIG. 2.

As is best seen in FIG. 3, a rectangular corner portion of plate 50 is cut out adjacent the forward edge of track 46 as indicated generally at 71. An elongate aligning finger, or guide, 70 (FIGS. 1, 3, 12) fits within the cut out portion 71 and is swingably connected adjacent one of its ends by a pivot pin 72 to one of guide bars 56. The finger being thus mounted has its lower edge resting substantially in the plane of the under surface of plate 50. The finger is swingable forwardly relative to the base plate.

Figure 12:
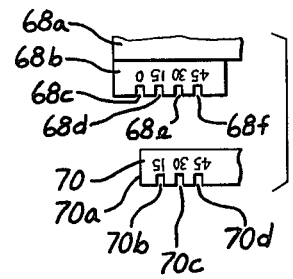
FIG. 12 is a fragmentary view taken along the line 12—12 in FIG. 1.

The outer end of finger 70 is indicated at 70a. Formed in the leading edge of finger 70 are a plurality of notches 70b, 70c, and 70d which are spaced at equidistant intervals inwardly from end margins 70a. As is best seen in FIGS. 3 and 12, end margin 70a is substantially aligned with notch 68c, notch 70b is aligned with notch 68d, notch 70c is aligned with notch 68e, and notch 70d is aligned with notch 68f along a line extending substantially parallel to the plane of saw blade 14. Each notch also has a degree notation adjacent thereto.

As the saw blade and housing are tilted from the vertical toward the position illustrated in FIG. 8, the point of intersection of the saw with the upper surface of the work piece which it is cutting shifts inwardly toward track 46. The distance which this point of intersection moves inwardly is indicated by notation "x" in FIG. 8 illustrating the distance between a point at which the saw blade would intersect the upper surface of a work piece when it is inclined at 45° from the vertical and the point at which it would intersect the upper surface of a work piece in a vertical position, as illustrated for the saw blade in dot-dashed outline at 14A.

The correct cut line to be made by the saw at the upper surface of the work piece is indicated by the aligned portions of indicator plate 68 and finger 70. Explaining further, to make a desired cut with the saw blade at a 0° tilt, or vertical, the user merely aligns end edge 70a and notch 68c on a desired cut line on the work piece. With these two parts of the indicator thus aligned, the saw will cut directly along the desired cut line. When the saw is swung to a fifteen degree tilt as indicated by the markings on plate 24, alignment of notches 70b and 68d on the cut line will produce a proper cut along the desired cut line. Similarly, at thirty degree inclination of the saw blade, notches 70c and 68e are aligned with the cut line, and at a forty-five degree inclination of the saw blade, notches 70d and 68f are aligned with the cut line to provide desired cutting on the desired cut line.

Conventional saws have only a single notch line and, thus, the saw blade will be shifted laterally out of line with the selected cut line as it is tilted further from the vertical. Thus, the single notch line indicator on the conventional saw is inaccurate when the saw is tilted. Further, on conventional saws, the operator has only a small opening in the saw guard or housing to see the blade to visually guide it by viewing the blade and cut line. Further, in conventional devices this is cumbersome and leaves the operator in an awkward position, leaning forward and to one side to be able to view the blade. Often this is dangerous and leaves the eyes exposed to sawdust and flying chips. This does not occur with the multiple aligning notches of the present invention.

Finger 70 may be releasably held in the position illustrated in FIGS. 1 and 3 either by detent means, or by means biasing it into this position which are not shown. To shift the finger forwardly and out of the path of saw blade 14 as it advances along a track, a bolt 76 as seen in FIG. 3 projects downwardly from the forward end of carriage 22 to engage finger 70 and shift it forwardly out of the path of the saw blade as the saw blade advances.

The carriage and track have freedom for limited, but extensive, movements relative to one another in the direction of the track. Advance of the carriage relative to the track is limited by engagement of a carriage carried screw 78 at the rear end of the carriage with a track carried screw 80 adjacent the forward end of the carriage. (See FIGS. 4, 6 and 8.) Advance of the track relative to the carriage is limited by engagement of the shank of a track carried screw 82 adjacent the rearward end of the track with the shank of a screw 84 that is threaded through plate 68 fixed to the carriage. In the illustrated apparatus for a given setting of the track, the carriage may be advanced about seventeen inches relative to the stationary track, and when this has been accomplished, the track may be advanced about seventeen inches relative to the carriage. Such advances may be effected by alternation, with each new setting of the track controlled by reference to the indicator notches on parts 68, 70.

Since the track will generally be set precisely by reference to a marked line or by reference to an edge of the work piece, the line of cut will be controlled and continued step-by-step with mechanical precision. The operator will not be required to follow the marked line visually as the saw progresses, nor to use his judgment in adjusting the saw to follow the line. Neither will the accuracy and smooth use of the saw operation be interfered with by friction and obstructions due to surface irregularities on the work piece.

Figure 5:
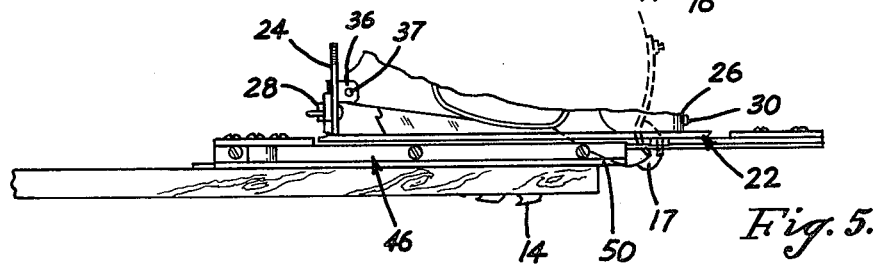
FIG. 5 is a fragmentary view similar to FIG. 4, but showing the saw advanced relative to the work and to the track on which the saw travels.
Figure 6:
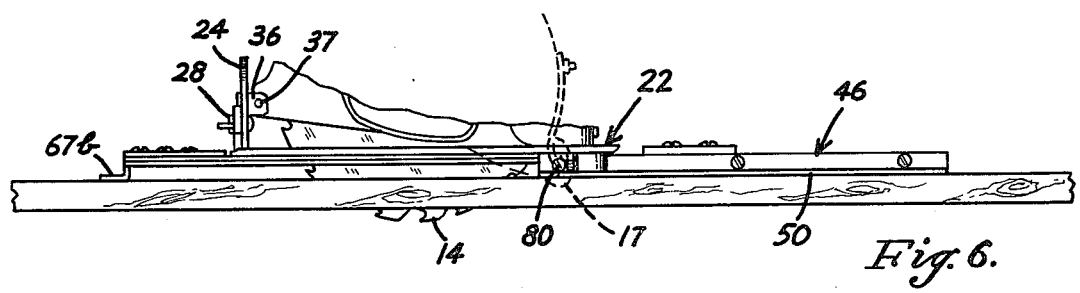
FIG. 6 is a view similar to FIG. 5 but showing the saw still farther advanced.

In operation, the track is placed on a work piece as illustrated in FIG. 4 with the carriage and saw drawn to their rearwardmost position. It is assumed that the depth and angularity of cut to be made by the saw blade have been set as previously described. The saw then is moved forwardly along the track as illustrated in FIG. 5, with the track providing a smooth and relatively friction-free advance for the saw along a desired path. The saw then may be moved beyond the track as illustrated in FIG. 6. It will be recognized that as the follower 17 on the rearward edge of the spring biased blade guard 16 enters the saw cut, it will aid in guiding the saw blade in making a straight cut. The normal spring biased rotation of the blade guard will hold follower 17 in the saw cut.

After the saw has been advanced forwardly of the track as illustrated in FIG. 6, it is a simple matter to advance the track to a position forwardly of the saw blade again, as illustrated in FIG. 4, with the saw maintained in the cut. The saw and carriage then are moved along the track again and this alternation permits a substantially straight line cut along the work piece.

What has been said up to this point has had to do chiefly with cutting a work piece along a line which is longer than track 46. Provision in the illustrated apparatus is also made for cutting across a work piece which is narrower than the length of the track. Such may be accomplished either at right angles or obliquely to the work piece.

Figure 2:
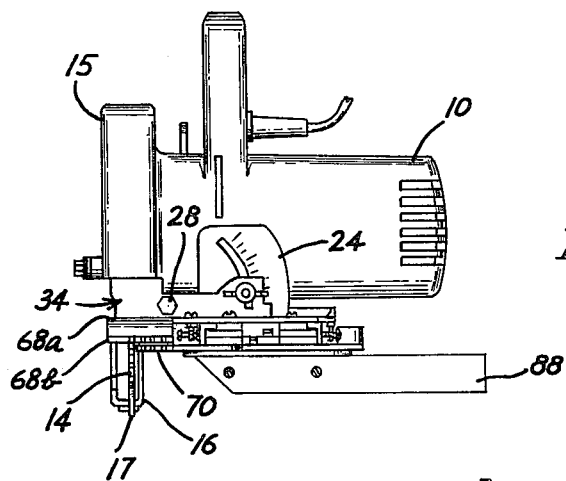
FIG. 2 is a front elevation view, on a smaller scale than FIG. 1, of the structure of FIG. 1.

To this end, the work engaging track plate 50 is provided with a straight slot 86 (see FIGS. 3 and 11) that extends in the direction and travel of the saw. An elongate, straight, engaging bar 88 is fixedly connected at right angles to a semi-circular, angularly graduated plate 90 that bears against the under side of plate 50, the engaging bar and graduated plate forming a separable side guide for engagement with a lateral face of the work piece. Bar 88, as is best seen in FIGS. 1, 2 and 8, extends downwardly below plate 50. Plate 90 lies flat against the lower face of guide plate 50. Plate 90 has a central opening through which the shank of a headed bolt or screw 92 passes to be threaded into one of bores 52 in block 54. A second headed screw, or bolt, 94 is passed upwardly through an arcuate slot 93 in graduated plate 90 and is threadably received in the other of previously described bores 52 in block 54. Screw 92 serves as a pivotal support for the plate 90 and for the work piece edge engaging bar 88. Plate 90 is free to turn about the axis of screw 92, but may be fixed with a reference to the scale on plate 90 in any chosen angular position and in any position lengthwise of slot 86 by tightening of clamping screw 94. The setting of scale 90 fixes the angular relation of the entire device relative to a work piece, and hence the saw path relative to the work piece. When it is desired to make cuts at a desired angular position relative to an edge of a work piece as illustrated in FIG. 7, plate 90 and bar 88 are fixed to the under side of plate 50 as illustrated. When it is desired to make longer cuts as previously described, screws 92, 94 and parts 88, 90 are removed.

While a preferred embodiment of the invention has been described herein, it should be apparent to those skilled in the art that variations and modifications are possible without departing from the spirit of the invention.

I claim:
1. Portable sawing apparatus comprising:
   a sawing unit including a motor driven saw blade rotatable in a plane about a central axis,
   a carriage upon which the sawing unit is mounted for adjustment relative to the carriage about an axis extending perpendicular to said blade to adjust the depth of saw cut and about an axis extending parallel to said blade to control the uprightness or the bevel of the saw cut,
   a track plate settable on a work piece in predetermined relation thereto, and
   cooperative, interfitted, relatively movable guide members affixed to the carriage and to the track plate respectively for controlling the direction of travel of the carriage and the sawing unit relative to the track plate in directions at right angles to the axis of the saw blade.

2. Portable sawing apparatus comprising:
   a sawing unit including a motor driven saw blade rotatable in a plane about a central axis,
   a carriage upon which the sawing unit is mounted for adjustment relative to the carriage to adjust the depth of saw cut and to control the uprightness or bevel of the saw cut,
   a track plate settable on a work piece in predetermined relation thereto, and
   cooperative, interfitted, relatively movable guide members affixed to the carriage and track plate respectively for guiding the direction of travel of the carriage relative to the track plate in a direction at right angles to the axis of the saw blade, the carriage and track plate being equipped with cooperative stop members for limiting the relative travel of the carriage and track plate, the construction and arrangement being such that when the track plate is set on a work piece the track plate and carriage can be advanced in alternation, with the direction of carriage advance controlled by the settings of the track plate.

3. Sawing apparatus as recited in claim 2, which further comprises a separable side guide for engagement with a lateral face of a work piece and means for securing the side guide in different angular relations to the track plate to control the orientation of the saw and saw path relative to the work piece.

4. The sawing apparatus of claim 2, which further includes a blade guard pivotally mounted to follow the blade, means biasing the guard in a forward direction, and a follower on the tip of the guard which rides in the slot of the work piece formed by the blade for assisting in maintaining the advance of the saw in a straight line.

5. The sawing apparatus of claim 2, which further includes a guide rotatably secured to the under side of the track plate for engagement with a side boundary of a work piece and means removably securing the guide to the track for rotation of the guide relative to the track, and means for securing the guide in a desired angular relationship to the track plate, the construction and arrangement being such that the saw may be caused through angular adjustment of the guide and consequent angular adjustment of the track plate relative to the work piece to traverse the work piece in a desired angular direction.

6. The sawing apparatus of claim 5, in which the guide comprises a flat angularly graduated plate that bears against the under surface of the track plate and means for clamping the disc fixedly in a chosen position within the range of adjustment of the guide.

7. The sawing apparatus of claim 2 which further comprises means operable to secure the saw carriage and the track against relative movement for carrying purposes.

8. Portable sawing apparatus comprising:
a sawing unit including a motor driven saw blade rotatable in a plane about a central axis,
a carriage upon which the sawing unit is mounted for adjustment relative to the carriage to adjust the depth of saw cut and to control the uprightness or bevel of the saw cut,
a track plate settable on a work piece in predetermined relation thereto,
cooperative, interfitted, relatively movable guide members affixed to the carriage and track plate respectively for guiding the direction of travel of the carriage relative to the track plate in a direction at right angles to the axis of the saw blade, the carriage and track plate being equipped with cooperative stop members for limiting the relative travel of the carriage and track plate, the construction and arrangement being such that when the track plate is set on a work piece the track plate and carriage can be advanced in alternation, with the direction of carriage advance controlled by the settings of the track plate, and
indicator means on said track plate and indicator means on said carriage aligned with one another in a plane substantially paralleling the plane of said saw blade to act as a guide in shifting of said carriage and track along a work piece.

9. The sawing apparatus of claim 8, wherein said indicator means comprises first indicia means on said carriage and second indicia means on said track plate, each indicia means including multiple indicator marks thereon spaced apart laterally of the plane of the saw blade, with selected indicator marks on said first indicia means aligned with selected indicator marks on said second indicia means, each pair of said aligned marks on said first and second indicia means indicating a line at which said saw blade will intersect the top surface of a work piece when tilted at a selected bevel angle.

10. The sawing apparatus of claim 9, which further includes means for indicating the degree of tilt of the saw blade from a position perpendicular to the under surface of the carriage, and means on said indicia means indicating aligned pairs of indicator marks corresponding to selected bevel degree notations.

11. Portable sawing apparatus comprising
a sawing unit including a motor driven saw blade rotatable in a plane about a central axis,
a carriage upon which the sawing unit is mounted for adjustment relative to the carriage to adjust the depth of saw cut and to control the uprightness or bevel of the saw cut,
a track plate settable on a work piece in predetermined relation thereto,
cooperative, interfitted, relatively movable guide members affixed to the carriage and track plate respectively for guiding the direction of travel of the carriage relative to the track plate in a direction at right angles to the axis of the saw blade, the carriage and track plate being equipped with cooperative stop members for limiting the relative travel of the carriage and track plate, the construction and arrangement being such that when the track plate is set on a work piece the track plate and carriage can be advanced in alternation, with the direction of carriage advance controlled by the settings of the track plate, and
an elongate finger pivotally connected to the forward end of said track plate which is settable to extend across the path of the saw blade and includes indicating means for locating the leading end of the track plate in relation to a selected cut line on a work piece, and corresponding indicating means on said carriage for aiding the operator in positioning the leading edge of the carriage together with the track plate in relation to its selected cut line on a work piece, and means affixed to the carriage in advance of the saw blade in a position to strike the finger and move it clear of the approaching saw as the carriage advances.

12. Portable sawing apparatus comprising
a sawing unit including a motor driven saw blade rotatable in a plane about a central axis,
a carriage upon which the sawing unit is mounted for adjustment relative to the carriage about an axis perpendicular to said blade to adjust the depth of saw cut and about a tilt axis parallel to said blade to adjust the angle of saw cut, such angle varying between 0° and 45° away from the vertical plane, such tilt axis being spaced a sufficient lateral distance from said blade that the vertical component of the saw cut depth increases as such angle increases,
a track plate settable on a work piece in predetermined relation thereto, and
cooperative, interfitted, relatively movable guide members affixed to the carriage and to the track plate respectively for controlling the direction of travel of the carriage and the sawing unit relative to the track plate in directions at right angles to the axis of the saw blade.

* * * * *